Figure 1:
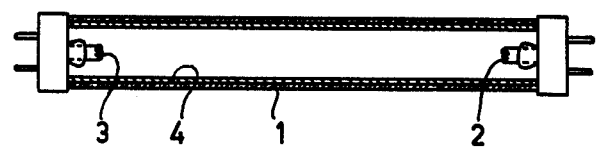

United States Patent [19]

Tak et al.

[11] 4,166,234
[45] Aug. 28, 1979

[54] FLUORESCENT DISCHARGE LAMP HAVING LUMINESCENT MATERIAL OF A SPECIFIED GRAIN SIZE

[75] Inventors: Marinus G. A. Tak; Robert C. Peters, both of Eindhoven, Netherlands

[73] Assignee: U.S. Philips Corporation, New York, N.Y.

[21] Appl. No.: 882,128

[22] Filed: Feb. 28, 1978

[30] Foreign Application Priority Data

Jun. 5, 1977 [NL] Netherlands .......................... 7705030

[51] Int. Cl.² ............................................. H01J 61/44
[52] U.S. Cl. ..................................................... 313/486
[58] Field of Search ................................. 313/486, 487

[56] References Cited

U.S. PATENT DOCUMENTS

| 2,103,032 | 12/1937 | Fritze et al. | 313/486 |
| 2,962,616 | 11/1960 | Homer et al. | 313/486 |
| 3,023,340 | 2/1962 | Repsher | 313/486 |
| 3,255,373 | 6/1966 | Broekhoven et al. | 313/486 |
| 3,833,827 | 9/1974 | Shaffer | 313/486 |
| 3,875,453 | 4/1975 | Thornton, Jr. | 313/487 |
| 3,937,998 | 2/1976 | Verstegen et al. | 313/487 |
| 3,992,645 | 11/1976 | Kaduk | 313/486 |

FOREIGN PATENT DOCUMENTS 50-32960 10/1975 Japan ........................................ 313/486

OTHER PUBLICATIONS

"Fluorescent Lamps and Lighting," by W. Elenbaas, 1962, Section 2.4 Preparation of Phosphors, pp. 23, 24, 25.

Primary Examiner—Palmer C. Demeo
Attorney, Agent, or Firm—Robert S. Smith

[57] ABSTRACT

A low-pressure mercury vapor discharge lamp provided with a luminescent Eu-activated rare earth oxide, a luminescent aluminate with hexagonal crystal structure activated by Ce or by Ce and Tb, or a luminescent aluminate with hexagonal crystal structure activated by Eu or by Eu and Mn. Not more than 5% by weight of the luminescent material has a grain size smaller than 1 $\mu$m and the maximum of the grain size distribution curve is located in the range from 2 to 8 $\mu$m.

4 Claims, 2 Drawing Figures

FLUORESCENT DISCHARGE LAMP HAVING LUMINESCENT MATERIAL OF A SPECIFIED GRAIN SIZE

The invention relates to a low-pressure mercury vapour discharge lamp provided with a luminescent coating which contains at least one luminescent material from the group of rare earth oxides activated by trivalent europium, the rare earth-magnesium-aluminates with hexagonal crystal structure, activated by cerium or by cerium and terbium, and the alkaline earth-magnesium-aluminates with hexagonal crystal structure activated by trivalent europium or by trivalent europium and trivalent magnanese, which luminescent material consists of a fine-grain material.

Low-pressure mercury vapour discharge lamps are generally known radiation sources which are very frequently used for both general illumination purposes and also for special applications, such as influencing photochemical processes. These lamps are usually provided with one or more luminescent materials consisting of a fine-grain powder which is disposed as a coherent, adhering coating to a support, usually the wall of the lamp.

Known, very efficiently red luminescing materials are the rare earth oxides activated by trivalent europium. These materials satisfy the formula $Ln_2O_3$, wherein Ln represent at least one of the elements yttrium, gadolinium and lutecium, and wherein a portion, for example from 0.1 to 10 at.% of the element indicated by Ln is replaced by europium. Lamps comprising such a luminescent rare earth oxide next to other luminescent materials are, for example, disclosed in Dutch Patent Application No. 7,313,694.

A group of very efficiently luminescing materials is constituted by the rare earth-magnesium-aluminates with hexagonal crystal structure, activated by cerium or by cerium and terbium. These materials which are known from Dutch Patent Application No. 7,214,862 can be represented by the formula $LaMgAl_{11}O_{19}$. On activation by cerium a portion of the lanthanum is replaced by cerium and a material is obtained radiating in the near ultraviolet part of the spectrum. On activation by both cerium and terbium the lanthanum is, preferably fully, replaced by said activators. On excitation these materials show a particularly efficient green radiation.

The above-mentioned Dutch Patent Application No. 7,214,862 furthermore discloses alkaline earth-magnesium-aluminates with hexagonal crystal structure activated by bivalent europium or by bivalent europium and bivalent manganese. These aluminates contain barium and/or strontium as alkaline earth metal and can be formed from mixtures of BaO and/or SrO, MgO and $Al_2O_3$ (or compounds which furnish these oxides) of comparatively different compositions. In general, however, the atomic fraction of aluminium is in these aluminates more than 1.8 times greater than the atomic fraction of magnesium and also greater than 3.7 times the atomic fraction of barium and/or strontium. On activation with bivalent europium, which replaces a part of the alkaline earth metal, an efficient blue-luminescing material is obtained. On activation by both bivalent europium and bivalent manganese, in which the manganese replaces a part of the magnesium, the blue europium luminescence is obtained together with the green luminescence band of manganese or the green manganese luminescence only, depending on the Eu:Mn-ratio.

The luminescent materials described above all have in common that they have a high efficiency, so that they can be used very advantageously in low-pressure mercury vapour discharge lamps in which they give rise to very high luminous fluxes. A particularly advantageous application is known from Dutch Patent Application 7,313,694 which discloses lamps comprising a red luminescent oxide as well as a green luminescent, Ce and Tb-activated aluminate and a blue luminescent, bivalent-europium activated aluminate. These lamps which are intended for general illumination purposes emit white light, not only a very good colour rendition but also a very high luminous flux being obtained. In addition, there is only a slight decline in the luminous flux during life of lamps.

The invention has for its object to provide lamps of the type mentioned in the preamble, having a still higher luminous flux and a still lower decline in this luminous flux during life. The invention is based on the recognition that this object can be achieved by means of a suitable choice of the grain size of the luminescent material.

A low-pressure mercury vapour discharge lamp of the type described in the preamble is characterized in accordance with the invention in that not more than 5% by weight of the luminescent material has a grain size smaller than 1 $\mu$m, and that the maximum of the grain size distribution curve of the luminescent material is located in the grain size range from 2 to 8 $\mu$m.

A lamp according to the invention contains a luminescent material of which the quantity of very fine powder particles having grain sizes in the sub-micron-range (smaller than 1 $\mu$m) is limited to not more than 5% by weight of the total quantity of that luminescent material. In this description and in the claims the grain size of a powder grain must be understood to mean the average diameter of the grain, that is to say that the grain size of a given grain of a given luminescent material is equal to the diameter of a spherical grain of the same material of the same weight. The luminescent material in a lamp according to the invention does not only satisfy the requirement imposed here relative to the weight fraction of very fine powder, but also the requirement that the maximum of the grain size distribution curve is located between 2 and 8 $\mu$m. The grain size distribution curve must be understood to mean the line which in a graphic representation connects the points which indicate the size of the weight fractions of the powder in the various parts of the entire grain size range.

It has already been known per se for a long time that the weight fraction of fine and very fine powder must be limited in a luminescent material. It is, namely, assumed that when using the material in lamps these fine grains result in losses in radiation by reflection. In addition it appeared that very fine grains have a more reactive surface area compared to coarse grains so that they can be more readily attacked, so that their contribution to the luminous flux during life of the lamps quickly declines. Added to this is the fact that the fine grains give rise to a large specific surface of the luminescent coating, which promotes possible corrosion. Therefore, in general, the presence of grains having a size in the order of 5 $\mu$m and smaller has sofar been avoided as much as possible. U.S. Pat. No. 3,255,373 discloses, for example, the use of luminescent halophosphates, a group of luminescent materials widely used in lamps up to the present, which substantially contain no grains of a size below 4 μm.

It was surprisingly found that in lamps according to the invention large quantities of grains in the relatively fine fraction from 1-2 μm and from 2-4 μm are admissible without drawbacks, especially without loss in luminous flux. It is then, however, essential that the weight fraction of luminescent material in the sub-micron range amounts to not more than 5% by weight. The use of luminescent materials with many grains in said relatively fine fractions furnishes even great advantages as will be shown below. In addition, it was found that the relatively fine grains in the lamps do not result in a greater decline in the luminous flux, which was absolutely not to be expected. The use of relatively fine powders in the lamps according to the invention appears from the above-mentioned requirement for the maximum of the grain size distribution curve and has the great advantage that a considerable savings in costs is obtained. Namely, when using a fine powder a lower coating weight of the luminescent coating in the lamp is sufficient, compared with a coarse powder. It is then possible to form with a smaller quantity of the luminescent material an optimum luminescent coating which absorbs all the ultra-violet radiation produced in the lamp.

In a lamp according to the invention the weight fraction of the luminescent material, having a grain size below 1 μm amounts to not more than 5% by weight because greater quantities would result in a considerable reduction in the luminescent flux emitted by the lamp. In general the luminescent materials which are suitable for use in lamps according to the invention have, if no special measures are taken in the preparation of these materials, a grain size distribution which does not satisfy this requirement. This applies in particular to the luminescent rare earth oxides such as $Y_2O_3(Eu)$ which, for example, may comprise 20% by weight of grains having a size smaller than 1 μm. In such cases the sub-micron fraction of the luminescent material must be separated to such an extent, for example by means of sedimentation or centrifugal separation, that the imposed requirement is satisfied.

Preference is given to lamps according to the invention in which not more than 1% by weight of the luminescent material has a grain size smaller than 1 μm. This results, namely, in the highest luminous fluxes.

A preferred embodiment of a lamp according to the invention is characterized in that not more than 25% by weight of the luminescent material has a grain size exceeding 15 μm. Such a limitation of the quantity of coarser grains results in a reduction in the coating weight of the luminescent coating in the lamps with the economic advantages this entails. Furthermore, there is the advantage that these powders are easier to process into a suspension which is usually required for applying the luminescent coating in the lamp. Finally, the use of powders containing few coarse grains, results in a uniform luminescent coating, which benefits the appearance of the lamps. It also appears that a proper build-up of the coating reduces the decline in the luminous flux, especially over a longer period of time.

The best results, in particular as regards luminous flux, decline in the luminous flux and economy are obtained with lamps according to the invention for which the maximum of the grain size distribution curve of the luminescent material is located in the grain size range from 2 to 4 μm. In general, the distribution curve for these materials will form a narrow band so that the fraction of coarse grains is very small.

Some embodiments of the invention wil now be further explained with reference to a drawing and a number of examples and measurements. In the drawing, FIG. 1 shows diagrammatically and in cross section a low-pressure mercury vapour discharge lamp according to the invention and FIG. 2 shows in a graph the luminous flux of lamps provided with a luminescent $Y_2O_3(Eu)$ as a function of the weight percentage of grains having a size smaller than 1 μm.

Figure 2:
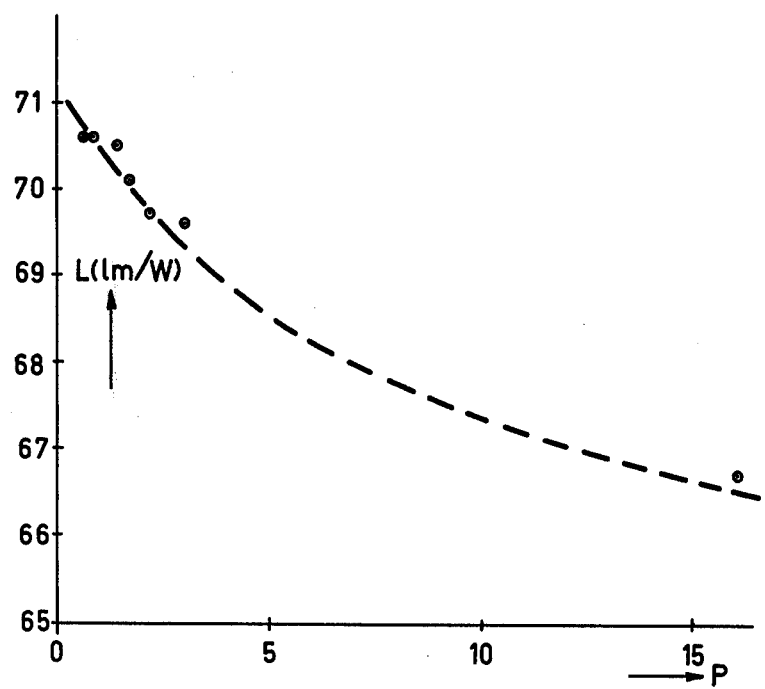

In FIG. 1 reference 1 is the glass wall of a lamp according to the invention. Electrodes 2 and 3 between which the discharge takes place on operation of the lamp are disposed at either end of the lamp. The lamp is provided with a rare gas mixture which is used as starting gas and, in addition, with a small quantity of mercury. On the inner side the wall 1 is coated with a luminescent coating 4, which comprises a luminescent material according to the invention. This material can be applied in a customary manner to the wall 1, for example by means of a suspension.

In order to investigate the influence of the weight percentage of grains smaller than 1 μm on the luminous flux, lamps were produced of the current 40W/T12-type which all comprised a red luminescent oxide in accordance with the formula $Y_{1.905}Eu_{0.095}O_3$. The luminescent oxides used had a different grain size distribution; they had, however, measured at the powder, substantially the same quantum efficiency. FIG. 2 shows in the form of a graph results of measurements of the luminescent flux of these lamps after 100 operating hours. The quantity P of grains smaller than 1 μm (in wt.%) is plotted on the horizontal axis and the luminous flux L (in lm/W) on the vertical axis. The graph shows that limiting P to not more than 5% by weight furnishes an obvious gain in luminous flux. It is also clear that values of P smaller than 1% by weight should be preferred.

Such an effect is also obtained with lamps provided with a green luminescent aluminate in accordance with the formula $Ce_{0.67}Tb_{0.33}MgAl_{11}O_{19}$. This appears from the values of measurements on 40W/T12-lamps provided with such an aluminate, summarized in the following table

| wt % < 1 /μm | lm/W |
| --- | --- |
| 0.5 | 116.8 |
| 1 | 115.3 |
| 4 | 113.8 |
| 12.5 | 107.7 |

Comparable results were obtained with lamps provided with a blue luminescent aluminate in accordance with the formula $Ba_{0.9}Eu_{0.1}MgAl_{10}O_{17}$:

| wt % <1 /μm | relative luminous flux |
| --- | --- |
| 1 | 116 |
| 2 | 115 |
| 3 | 113.8 |

To investigate the effect of the value of the weight fraction of the luminescent material above 15 μm on the coating weight of the luminescent coating, various lamps of the current 40W/T12-type were fabricated again and provided with luminescent Y₂O₃(Eu) with different grain size distributions. The following table shows the coating weight (gram/lamp) for these lamps required to form an optimum coating with luminescent powders having various weight percentages above 15 μm (wt%>15 μm).

| wt. % > 15 /μm | gram/lamp |
|---|---|
| 2.1 | 4.05 |
| 8 | 5.60 |
| 10 | 6.95 |
| 32 | 7.55 |
| 34 | 8.10 |
| 43 | 8.85 |
| 71 | 10.4 |

The table clearly shows that considerable savings in luminescent material can be obtained by limiting the weight percentage above 15 μm.

Also for the green, Ce and Tb-activated, aluminate the influence of the weight %>15 μm on the coating weight was investigated:

| wt. % > 15 /μm | gram/lamp |
|---|---|
| 2 | 3.56 |
| 6.5 | 3.75 |
| 17 | 4.17 |
| 34.5 | 7.0 |

A low percentage of grains having a size over 15 μm also has a favourable influence on the decline in the luminous flux of the lamp. The luminous flux after 100 and after 1000 operating hours was measured at lamps which were again provided with Y₂O₃(Eu) with different grain size distributions. The following table indicates the decline in the luminous flux ΔL(100–1000h) in %.

| wt. % > 15 /μm | ΔL(100–1000h) in % |
|---|---|
| 5.6 | 2.0 |
| 12.4 | 2.3 |
| 30.6 | 3.7 |
| 35 | 4.2 |
| 43 | 4.9 |
| 60 | 6.5 |

Finally it should be noted that for determining grain size distributions and weight fractions of the luminescent materials in given grain size ranges use was made of a photosedimentometer of Messrs. Leitz (desribed in W. Batel: "Einführung in die Korngrössenmesstechnik," Berlin, 1964). In this apparatus the transmission of light through a settling suspension of the powder to be investigated is determined photoelectrically as a function of the time. From this the various grain size fractions can be calculated. The suspension used consists of approximately 25–30 mg of the material to be investigated in 10 ml of 0.001M sodium pyrophosphate solution. To prepare this suspension use is made of an ultrasonic bath.

What is claimed is:

1. A low pressure mercury vapour discharge lamp provided with a luminescent coating which comprises at least one luminescent material from the group of rare earth oxides activated by trivalent europium, the rare-earth-magnesium-aluminates with hexagonal crystal structure, activated by cerium or by cerium and terbium, and the alkaline earth-magnesium-aluminates with hexagonal crystal structure activated by bivalent europium or by bivalent europium and by bivalent manganese, which luminescent material consists of a fine-grain material, characterized in that not more than 5 wt.% of the luminescent material has a grain size smaller than 1 μm and that the maximum of the grain size distribution curve of the luminescent material is located in the grain size range from 2 to 8 μm.

2. A low-pressure mercury vapour discharge lamp as claimed in claim 1, characterized in that not more than 1% by weight of the luminescent material has a grain size smaller than 1 μm.

3. A low-pressure mercury vapour discharge lamp as claimed in claim 1 or 2, characterized in that not more than 25% by weight of the luminescent material has a grain size over 15 μm.

4. A low-pressure mercury vapour discharge lamp as claimed in claim 1 characterized in that the maximum of the grain size distribution curve of the luminescent material is located in the grain size range from 2 to 4 μm.

* * * * *